United States Patent
Wang et al.

(10) Patent No.: US 7,657,570 B2
(45) Date of Patent: *Feb. 2, 2010

(54) OPTIMIZING AGGREGATE PROCESSING

(75) Inventors: Yun Wang, Saratoga, CA (US);
Fen-Ling Lin, San Jose, CA (US);
Yao-Ching Chen, Saratoga, CA (US);
Mengchu Cai, Redmond, WA (US);
Jason Alexander Cu, San Jose, CA (US); Allan Benjamin Lebovitz, San Jose, CA (US); Li-Mey Lee, Cupertino, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 11/738,406

(22) Filed: Apr. 20, 2007

(65) Prior Publication Data
US 2007/0192285 A1  Aug. 16, 2007

Related U.S. Application Data

(63) Continuation of application No. 10/325,854, filed on Dec. 19, 2002, now Pat. No. 7,243,098.

(51) Int. Cl.
*G06F 17/00* (2006.01)

(52) U.S. Cl. .................... 707/104.1; 707/101; 707/102; 707/103 R

(58) Field of Classification Search ............... 707/1–10, 707/100–104.1, 200–206
See application file for complete search history.

(56) References Cited

U.S. PATENT DOCUMENTS

| | | | |
|---|---|---|---|
| 5,089,985 A | 2/1992 | Chang et al. |
| 5,428,737 A | 6/1995 | Li et al. |
| 5,764,973 A | 6/1998 | Lunceford et al. |
| 5,778,354 A | 7/1998 | Leslie et al. |
| 5,822,747 A | 10/1998 | Graefe et al. |

(Continued)

FOREIGN PATENT DOCUMENTS

WO  0182133  11/2001

OTHER PUBLICATIONS

Canadian Patent Application with Serial No. 2349905, filed Jun. 1, 2001, entitled "System and Method of Mapping Between Software Objects and Structured Language Element Based Documents", invented by Green, T., J. Warfield, and M. Beisiegel.

(Continued)

*Primary Examiner*—Isaac M Woo
(74) *Attorney, Agent, or Firm*—Janaki K. Davda; Konrad Raynes & Victor LLP

(57) ABSTRACT

Disclosed is method for processing an aggregate function. Rows that contain a reference to intermediate result structures are grouped to form groups. For each group, aggregate element structures are formed from the intermediate result structures and, if the aggregate function specifies ordering, the aggregate element structures are sorted based on a sort key.

9 Claims, 9 Drawing Sheets

U.S. PATENT DOCUMENTS

| | | | |
|---|---|---|---|
| 5,845,299 | A | 12/1998 | Arora et al. |
| 5,911,145 | A | 6/1999 | Arora et al. |
| 6,070,175 | A | 5/2000 | Mezei |
| 6,105,024 | A | 8/2000 | Graefe et al. |
| 6,198,480 | B1 | 3/2001 | Cotugno et al. |
| 6,233,610 | B1 | 5/2001 | Hayball et al. |
| 6,356,906 | B1 | 3/2002 | Lippert et al. |
| 6,356,920 | B1 | 3/2002 | Vandersluis |
| 6,405,191 | B1 | 6/2002 | Bhatt et al. |
| 6,487,546 | B1 | 11/2002 | Witkowski |
| 6,604,100 | B1 | 8/2003 | Fernandez et al. |
| 6,775,831 | B1 | 8/2004 | Carrasco et al. |
| 6,941,521 | B2 | 9/2005 | Lin et al. |
| 7,028,312 | B1 | 4/2006 | Merrick et al. |
| 2001/0037345 | A1 | 11/2001 | Kiernan et al. |
| 2002/0013790 | A1 | 1/2002 | Vandersluis |
| 2002/0116412 | A1 | 8/2002 | Barnes et al. |
| 2003/0182268 | A1 | 9/2003 | Lal |
| 2004/0073553 | A1 | 4/2004 | Brown et al. |
| 2004/0168124 | A1 | 8/2004 | Beisiegel et al. |

OTHER PUBLICATIONS

Cheng, J., and J. Xu, "XML and DB2", [online]. Proceedings of 16th International Conference on Data Engineering, Feb. 28-Mar. 3, 2000, Retrieved from the Internet at <URL: http://portal.acm.org/citation.cfm?coll=GUIDE&dl=GUIDE&id=847353>, p. 569.

Dessaux, C., "Exchanging XML-Based Messages on the Oracle 9i Application Server", [online]. vol. 2, No. 4, Retrieved from the Internet at <URL: http://www.XML-Journal.com>, pp. 48-51, 2001.

Eisenberg, A., and J. Melton, "SQL/XML is Making Good Progress", ACM SIGMOD Record, Jun. 2002, vol. 31, No. 2, pp. 101-108.

Galindo-Legaria, C., and M. Joshi, "Orthogonal Optimization of Subqueries and Aggregation", Proceedings of the 2001 ACM SIGMOD International Conference on Management of Data, 2001 Microsoft Corp., pp. 571-581.

IBM Corp., "Conversion of Final Form Data, Such as AFP, to XML", Apr. 2001, Research Disclosure n444208, #208, p. 709.

IBM Corp., "Extensible Markup Language (XML) Server Pages Having Custom Document Object Model (DOM) Tags", Sep. 30, 1999, Dossier No. AUS919990412, 6 pp.

IBM Corp., "Generating Hierarchical XML Data From a Flat (Non-Hierarchical) Data Source", Nov. 2001, Research Disclosure n451156, #156, p. 1966.

IBM Corp., "Method for Processing a Document Object Model (DOM) Having Custom Tags", Sep. 30, 1999, Dossier No. AUS919990421, 6 pp.

IBM Corp., "XML and WebSphere Studio Application Developer", [online]. [Retrieved on Aug. 29, 2002]. Part 3, SQI and SML, Retrieved from the Internet at <URL: http://www7b.software.ibm.co..d/techjournal/0202_haggarty/haggarty.html>, pp. 1-4.

Jennings, R., "Create Powerful Web Reports: Use VB Code to Generate T-SQL Queries, Templates, and Stylesheets for SQL Server 2000 XML Web Reports", [online]. [Retrieved on Aug. 29, 2002], Visual Studio Magazine, retrieved from the Internet at <URL: http://www.fawcette.com/Arc...j/2001/ENT0109/rj0109ENT/rj0109ENT/rj0109ENT-1.asp>, 1 p.

Shanmugasundaram, J., S. Eugene, R. Barr, M. Carey, B. Lindsay, H. Pirahesh, and B. Reinwald, "Efficiently Publishing Relational Data as XML Documents", The International Journal on Very Large Data Bases, Sep. 2001, vol. 10, No. 2-3, pp. 133-154.

SYSPRO Times, "XML Report Viewer", [online], Quarter 2, 2002, retrieved from the Internet at <URL:http://www.rte-cyber.com>, pp. 1-8.

U.S. Appl. No. 09/409,598, filed Sep. 30, 1999, entitled "Extensible Markup Language (XML) Server Pages Having Custom Document Object Model (DOM) Tags", invented by Claussen, C.S., M.H. Conner, B.C. Zumbrunnen, and M.D. McClain.

U.S. Appl. No. 09/409,600, filed Sep. 30, 1999, entitled "Method for Processing a Document Object Model (DOM) Having Custom Tags", invented by Claussen, C.S. and B.C. Zumbrunnen.

U.S. Appl. No. 10/325,781, filed Dec. 19, 2002, entitled "Method, System, and Program for Optimizing Processing of Nested Functions", invented by Lin, F., Y.C.S. Chen, Y. Want, G. Zhang, M. Cai, J.A. Cu, and L. Lee.

OPTIMIZING AGGREGATE PROCESSING

CROSS-REFERENCE TO RELATED APPLICATIONS

This application is a continuation application of and claims the benefit of U.S. Pat. No. 7,243,098, "METHOD, SYSTEM, AND PROGRAM FOR OPTIMIZING AGGREGATE PROCESSING", having application Ser. No. 10/325,854, filed Dec. 19, 2002, the disclosure of which is incorporated herein by reference in its entirety.

BACKGROUND OF THE INVENTION

1. Field of the Invention

The present invention is related to optimizing aggregate processing.

2. Description of the Related Art

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

The SQL standard introduced a set of new Extensible Markup Language (XML) publishing functions, including scalar functions XMLELEMENT, XMLFOREST, and XMLCONCAT, and an aggregate function, XMLAGG. These functions take SQL data as input and generate XML data as output.

An XMLELEMENT function creates an XML element. In particular, the XMLELEMENT function receives an identifier for use in naming the created XML element, an optional set of attribute name/value items, and an optional list of values for the content of this element. An XMLELEMENT function returns an instance of type XMLType.

An XMLFOREST function creates a forest of XML elements, which contains an element for each of the XMLFOREST arguments. The XMLFOREST function converts each of its argument parameters to XML, and then returns an XML fragment that is the concatenation of these converted arguments.

An XMLCONCAT function creates a forest of XML elements. The XMLCONCAT function takes as input a series of XML values, concatenates the series of values, and returns the concatenated series.

An XMLAGG function is an aggregate function that produces a forest of XML elements from a collection of XML elements. In particular, the XMLAGG function concatenates XML values from each row in a group into a single XML value. An optional ORDER BY clause may be specified within the XMLAGG function to request a particular order of the concatenation. An optional GROUP BY clause may be used in the SELECT statement to specify how to group rows.

Additionally, an XMLATTRIBUTES function defines one or more XML attributes for the XML element created by the XMLELEMENT function. Syntactically, XMLELEMENT and XMLATTRIBUTES are also referred to as "specifications."

Due to the XML feature of element nesting for parent-child relationships and sequence concatenation, the XMLELEMENT, XMLFOREST, XMLCONCAT, and XMLAGG functions are commonly used in nesting and concatenation. Nested functions are ones in which one or more functions are included within another function. For example, SELECT statement (1) includes a set of nested functions, with the XMLATTRIBUTES function and the XMLFOREST functions nested in the XMLELEMENT function:

```
SELECT XMLAGG                                                    (1)
    (XMLELEMENT (NAME "Emp",
        XMLATTRIBUTES (e.fname || ' ' || e.lname AS "name"),
        XMLFOREST (e.birthday, e.dept AS "department") )
        ORDER BY e.lname)
FROM EMPLOYEE e ;
GROUP BY e.dept;
```

A traditional function evaluation technique for nested functions is to evaluate the functions inside-out. That is, the inner most functions are evaluated first and their results are used as input to the next outer level function, whose outputs are used as input to the next outer level function, etc.

The SELECT statement (1) has the following arguments: fname, lname, birthday, and dept. The XMLATTRIBUTES function has an argument, which is the concatenation of fname and lname. The XMLFOREST function generates a forest of two elements, one for each argument birthday and dept. The XMLAGG function aggregates rows, which are ordered by last name (e.lname) within groups, with each group corresponding to a department (e.dept).

Assuming that the following are input values for the arguments of SELECT statement (1): fname='Jack', lname='Lee', birthday='10-28-1960', and dept='shipping', the evaluation of SELECT statement (1) proceeds as follows. First, the XMLATTRIBUTES function is evaluated and XMLATTRIBUTES(e.fname ||' '|| e.lname AS "name") evaluates to name="Jack Lee". Second, the XMLFOREST function is evaluated and XMLFOREST(e.birthday, e.dept AS "department") evaluates to two elements: <birthday> 1960-10-28</birthday>    <department>shipping</department>. The bracketed text (e.g., <birthday>) is a start tag of an element in XML, and the bracketed text with a slash (e.g., </birthday>) is an end tag of the element. Third, the XMLELEMENT function is evaluated and XMLELEMENT (NAME "Emp", XMLATTRIBUTES (e.fname ||' '|| e.lname AS "name"), XMLFOREST (e.birthday, e.dept AS "department")) evaluates to:

<Emp name="Jack Lee"> <birthday> 1960-10-28</birthday> <department> shipping </department> </Emp>

In this process, the result of each function is usually copied to generate the next level result. For example, the results of the XMLATTRIBUTES function and the XMLFOREST function are copied to generate the results of the XMLELEMENT function. The number of times data is copied is proportional to the levels of nesting. For example, since there are two levels of nesting, in SELECT statement (1), data is copied twice. Even with the simple example illustrated in SELECT statement (1), copying of data at each of the levels of nesting leads to inefficiency of the function evaluation due to data movement.

Moreover, since XML does not limit the number of levels of nesting, the number of levels of nesting for XML may be very large. Nesting levels of 7-14 are commonly seen. The large number of levels of nesting would require a great deal of copying of data, which is very inefficient when evaluating a function. In addition, if character large objects (CLOBs) are involved, the size of copied data is even larger.

Once the XMLELEMENT function is evaluated for each one of a set of rows, the XMLAGG function processes the results. The evaluation of the GROUP BY clause sorts data by one or more grouping columns, which in this case is employee department (e.dept) using a SORT operation. Additionally, rows in each group are sorted for the ORDER BY clause within the XMLAGG function.

There are two traditional alternatives to processing GROUP BY and ORDER BY clauses. One alternative is to append the ORDER BY key into GROUP BY columns for sort. One sort can then achieve both grouping and ordering. However, if there are two or more XMLAGG functions with ORDER BY clauses, multiple sorts are needed, and the intermediate results from sorting and grouping are merged.

The other alternative is to sort rows in each group separately for an ORDER BY clause within an XMLAGG function. Each SORT operation uses a workfile to store data for the sort process. Thus, the traditional approaches, which involve multiple SORT operations, also involve multiple workfiles for the multiple sorts. These workfiles use resources (e.g., memory) that are very expensive.

Thus there is a need in the art for improved aggregate processing.

SUMMARY OF THE INVENTION

Provided is a method for processing an aggregate function. Rows that contain a reference to intermediate result structures are grouped to form groups. For each group, aggregate element structures are formed from the intermediate result structures and, if the aggregate function specifies ordering, the aggregate element structures are sorted based on a sort key.

The described implementations of the invention provide a method for optimizing aggregate function processing.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
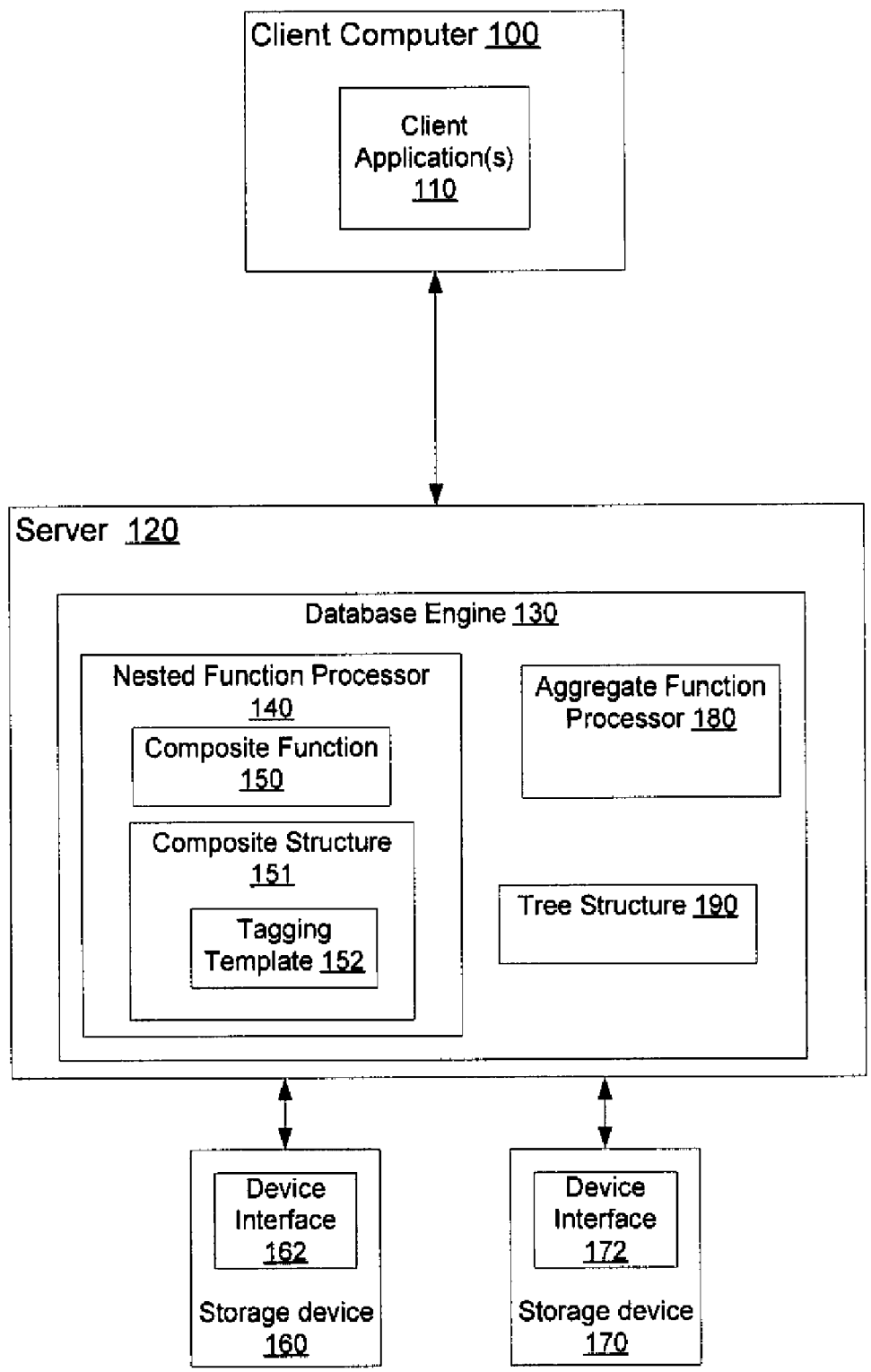
FIG. 1 illustrates, in a block diagram, a computing environment in accordance with certain implementations of the invention.

FIG. 1 illustrates, in a block diagram, a computing environment in accordance with certain implementations of the invention. A client computer 100 executes one or more client applications 110. A client application 110 may be any type of application program. The client computer 100 is connected to a management server 120 by a network, such as a local area network (LAN), wide area network (WAN), or the Internet. The Internet is a world-wide collection of connected computer networks (i.e., a network of networks).

Furthermore, the server 120 is connected to storage devices 160, 170, and each storage device 160, 170 has a device interface 162, 172. For example, each storage device 160 and 170 may be a redundant array of independent disks (RAID). A RAID device enables storage of the same data on multiple hard disks, thus allowing simultaneous accesses to copies of the data.

The client applications 110 may access data managed by the server 120. The server 120 includes a database engine 130, which includes a nested function processor 140. In certain implementations, the database engine 130 is a DB2® Universal Database (UDB) for z/OS, which is available from International Business Machines, Corporation.

In certain implementations, a new composite function 150 is provided for optimized processing of nested XML functions. The composite function 150 is generated for the highest level function in the set of nested functions (e.g., an XMLELEMENT function). The input to the composite function 150 is a list of arguments. When the composite function 150 is generated for the nested functions in SELECT statement (1), the first argument is a reference to a tagging template 152 and the remaining arguments are arguments in the nested functions. For example, the list of arguments may represent the arguments of XMLATTRIBUTES and XMLFOREST functions nested within an XMLELEMENT function. In certain implementations, the composite function 150 takes on the format of XMLCONSTRUCT function (2). The output of the composite function 150 for a single row is a serialized text string.

XMLCONSTRUCT (<reference to tagging template>, (2)
<list of remaining arguments>)

Figure 3:
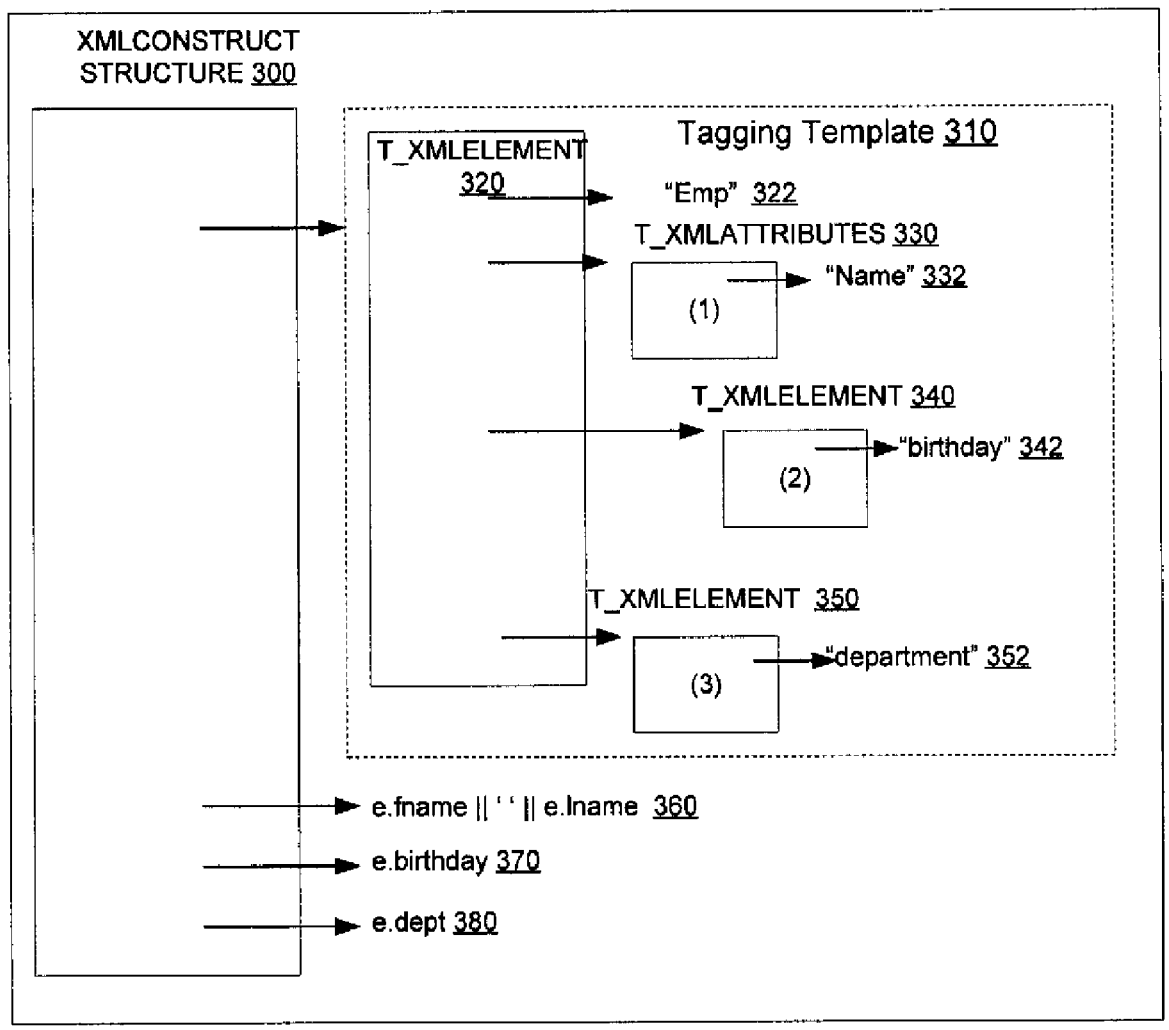
FIG. 3 illustrates a sample XMLCONSTRUCT structure that is generated for nested functions in a SELECT statement in accordance with certain implementations of the invention.
Figure 6:
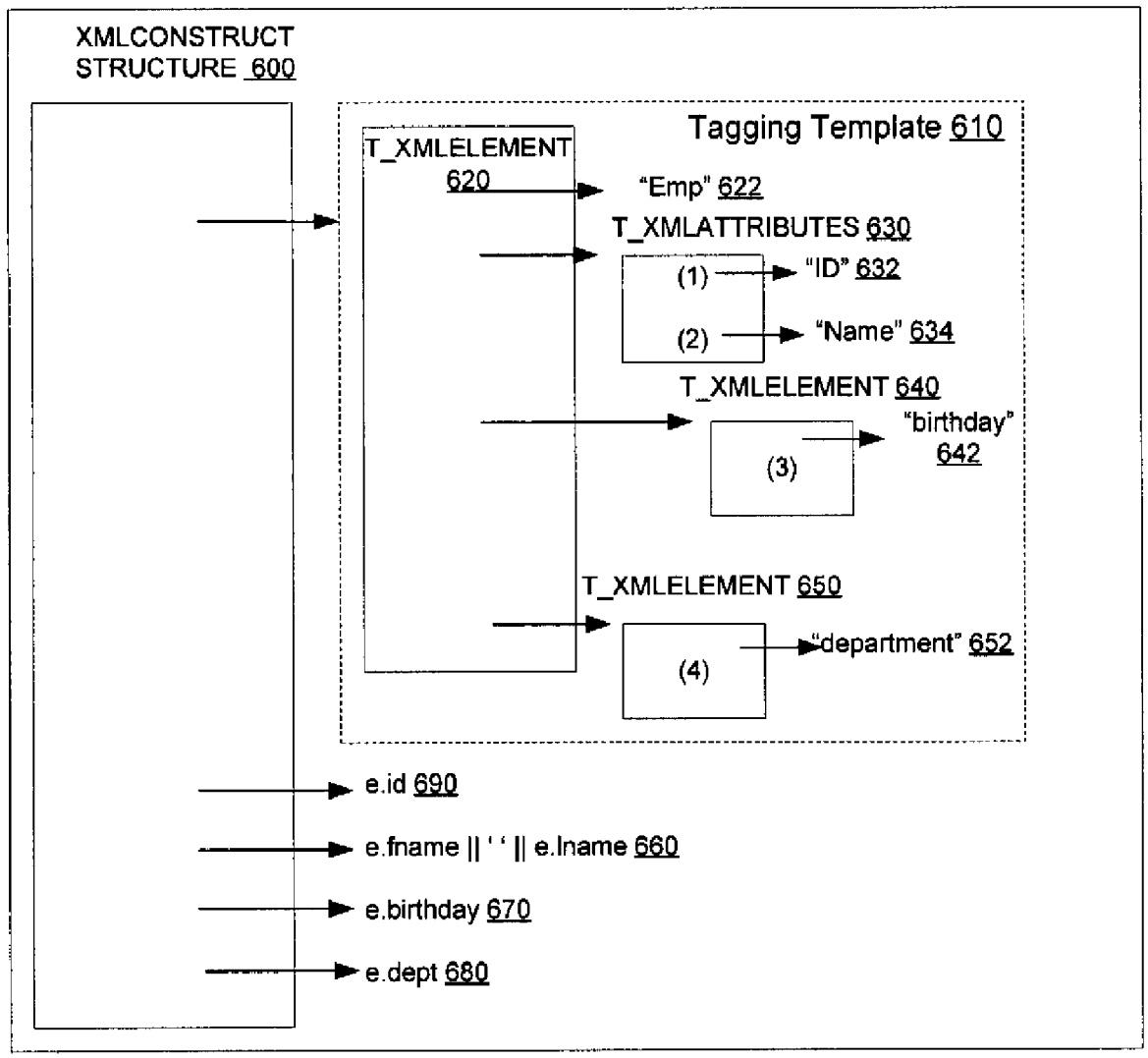
FIG. 6 illustrates one implementation of the architecture of the computer systems in accordance with certain implementations of the invention.

In certain implementations, the composite function 150 is not generated, and, instead, a composite structure 151 that includes a tagging template 152 is generated. The composite structure including the tagging template 152 corresponds to a composite function 150 and is generated for a set of nested functions. A sample structure of a composite structure 151 including a tagging template 152 is illustrated in FIGS. 3 and 6, which are discussed below. The tagging template 152 is a structure of nodes for XML elements and XML attributes for the nested functions. It is to be understood that the structure of the composite structure 151 and the tagging template 152 may vary from the examples illustrated herein without departing from the scope of the invention.

In certain implementations, a new aggregate function processor 180 is provided for optimized processing of aggregate functions (e.g., an XMLAGG function). In certain implementations, the aggregate function processor 180 invokes the nested function processor 140 to process nested functions that are provided as an argument to an aggregate function. In certain implementations, the functionality of the nested function processor 140 is incorporated into the aggregate function processor 180.

A tree structure 190 in a parse tree is generated for a nested function. That is, the nested functions are parsed into a parse tree format. The tree structure 190 is used to generate the composite function 150 and the composite structure 151 that includes a tagging template 152.

At bind time, the nested functions (e.g., the XMLELEMENT function in SELECT statement 3) are represented in a tree structure 190 in a parse tree (i.e., the nested functions are parsed into a parse tree format). Bind time refers to the time during which the functions are processed and an execution plan for executing the function is developed. On the other hand, execution time refers to the time during which the function is evaluated against the argument input values.

The following is a sample SELECT statement (3) with an aggregate function and nested functions:

```
SELECT XMLAGG                                              (3)
      (XMLELEMENT (NAME "Emp",
          XMLATTRIBUTES (e.fname || ' ' || e.lname AS "name"),
          XMLFOREST (e.birthday, e.dept AS "department") )
      ORDER BY e.lname)
FROM EMPLOYEE e
GROUP BY e.dept;
```

Figure 2A:
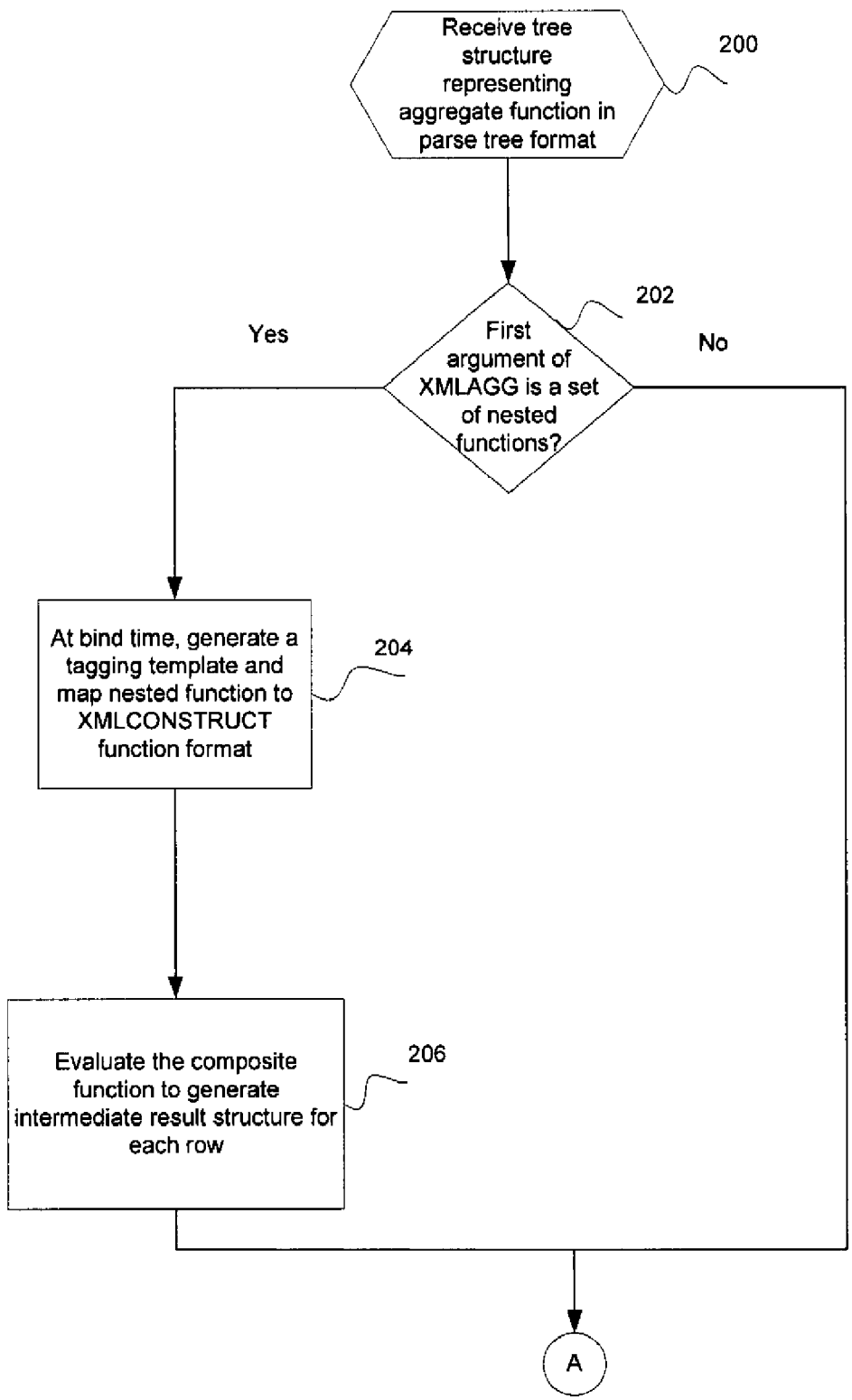
FIGS. 2A and 2B illustrates logic implemented in an aggregate function processor in accordance with certain implementations of the invention.
Figure 2B:
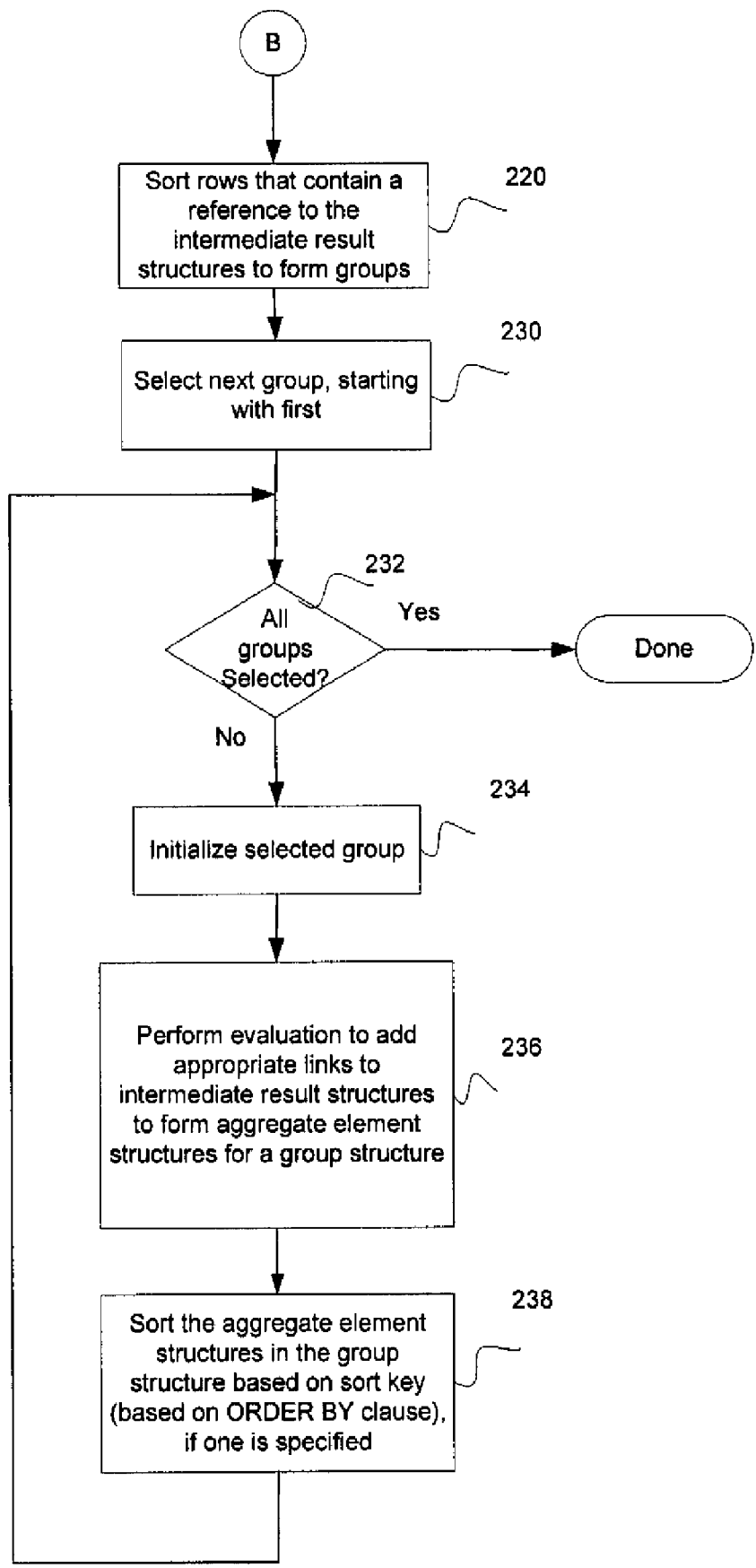

FIG. 2A illustrates logic implemented in an aggregate function processor 180 in accordance with certain implementations of the invention. Control begins at block 200 with the aggregate function processor 180 receiving a tree structure 190 representing an aggregate function, such as the XMLAGG function in SELECT statement (3), in parse tree format. In block 202, it is determined whether the first argument to the aggregate function is a set of nested functions or column data. If the first argument is a set of nested functions, processing continues to block 204, otherwise, processing continues to block 220 (FIG. 2B).

If the first argument to the aggregate function is column data, processing in blocks 204-206 is not performed. For ease of understanding an aggregate function whose first argument is column data, SELECT statement (4) is provided, which includes an XMLAGG function for which the first argument is an XML column ("xmlcol"). The XML column holds a reference (e.g., a pointer to) the intermediate result structures for each row to be evaluated by the XMLAGG function.

```
SELECT XMLAGG ( xmlcol ORDER BY lname )                    (4)
FROM ( SELECT DISTINCT e.id, e.dept, e.lname,
          XMLELEMENT(NAME "Emp",
              XMLATTRIBUTES( e.fname ||' '|| e.lname AS "name"),
              XMLFOREST(e.birthday, e.dept AS "department") )
      FROM employee e ) as X(id, dept, lname, xmlcol)
GROUP BY X.dept;
```

In SELECT statement (4), xmlcol is a column of the result table of the inner SELECT query (i.e., a table expression). The xmlcol column is the result of evaluation the XMLELEMENT function. The intermediate result of XMLAGG is exactly the same as the one in the disclosure.

SELECT statement (5) provides a more complex query that includes nesting an XMLAGG function inside an XMLAGG function with a scalar select. Dashes (-) precede comments in SELECT statement (5).

```
SELECT XML2CLOB(                                           (5)
   XMLELEMENT -- one top element for the department 'D01'
      ( NAME "Dept",
         XMLATTRIBUTES ( D.DEPTNO AS "deptno",
             D.DEPTNAME AS "name" ),
         ( SELECT XMLAGG ( -- all the projects under dept D01
             XMLELEMENT (
                NAME "Proj",
                XMLATTRIBUTES (P.PROJNO AS "projno",
                    P.PROJNAME AS "name"),
                ( SELECT XMLAGG ( -- all the employees under
                each proj.
                   XMLELEMENT (
                      NAME "Emp",
                      XMLATTRIBUTES
                      (E.EMPNO as "empno"),
                   E.FIRSTNME || ' ' || E.LASTNAME
                   )
                   ORDER BY E.LASTNAME)
                FROM DSN8810.EMPPROJACT EP,
                   DSN8810.EMP E
                WHERE EP.PROJNO = P.PROJNO AND
                   EP.EMPNO = E.EMPNO
                ) )
             )
          FROM DSN8810.PROJ P
          WHERE P.DEPTNO = D.DEPTNO
          )
       ))
   FROM DSN8810.DEPT D
   WHERE D.DEPTNO = 'D01';
```

SELECT statement (5) lists all the projects within department D01 and all the employees working for each project in a hierarchical structure, which is typical in XML. The lowest level XMLAGG function will have a group structure similar to the group structure 500 illustrated in FIG. 5. The upper level XMLAGG functions have the group structure for each row. Each aggregate element structure is the intermediate result of lower-level XMLAGGs, instead of the intermediate result of a scalar composite function. Because of this, serialization is not performed for each XMLAGG function, but, instead, is performed after all of the XMLAGG functions and contained scalar functions (if any) have been processed and the serialized result is requested at the top of the query. The term "aggregate element structure" includes the information of the intermediate results structure (e.g., 400 for a scalar function argument, or even 500 for nested XMLAGG argument) and includes the next and previous links, which link the structures with each other.

Continuing with FIG. 2A, in block 204, at bind time, the nested functions are mapped to a composite function 150 and a composite structure 151 that includes a tagging template 162 is generated for the nested functions using the tree structure 190. This processing may be performed by the aggregate function processor 180 when the functionality of the nested function processor 140 is incorporated into the aggregate function processor 180. Otherwise, this processing may be performed by the aggregate function processor 180 invoking the nested function processor 140 for each row for which the nested functions are to be evaluated.

The processing for the nested functions at bind time by the composite function 140 is bottom-up (i.e., the inner most function is evaluated first). To convert the nested functions (e.g., XMLELEMENT, XMLATTRIBUTES, and XMLFOREST) into a single composite function 150 (e.g., XMLCONSTRUCT), the tree structure 190 is traversed and processed top-down. Additionally, the tagging template and the list of arguments are built by concatenating the elements from each function that are to be part of the tagging template and the list of arguments.

For example, the nested functions are mapped to an XMLCONSTRUCT function format to generate a composite function. Additionally, the tagging template is used to describe the nesting and concatenation structure. In certain implementations, the generation of the composite function 150 and the composite structure 151 that includes the tagging template 152 occur simultaneously.

Figure 2C:
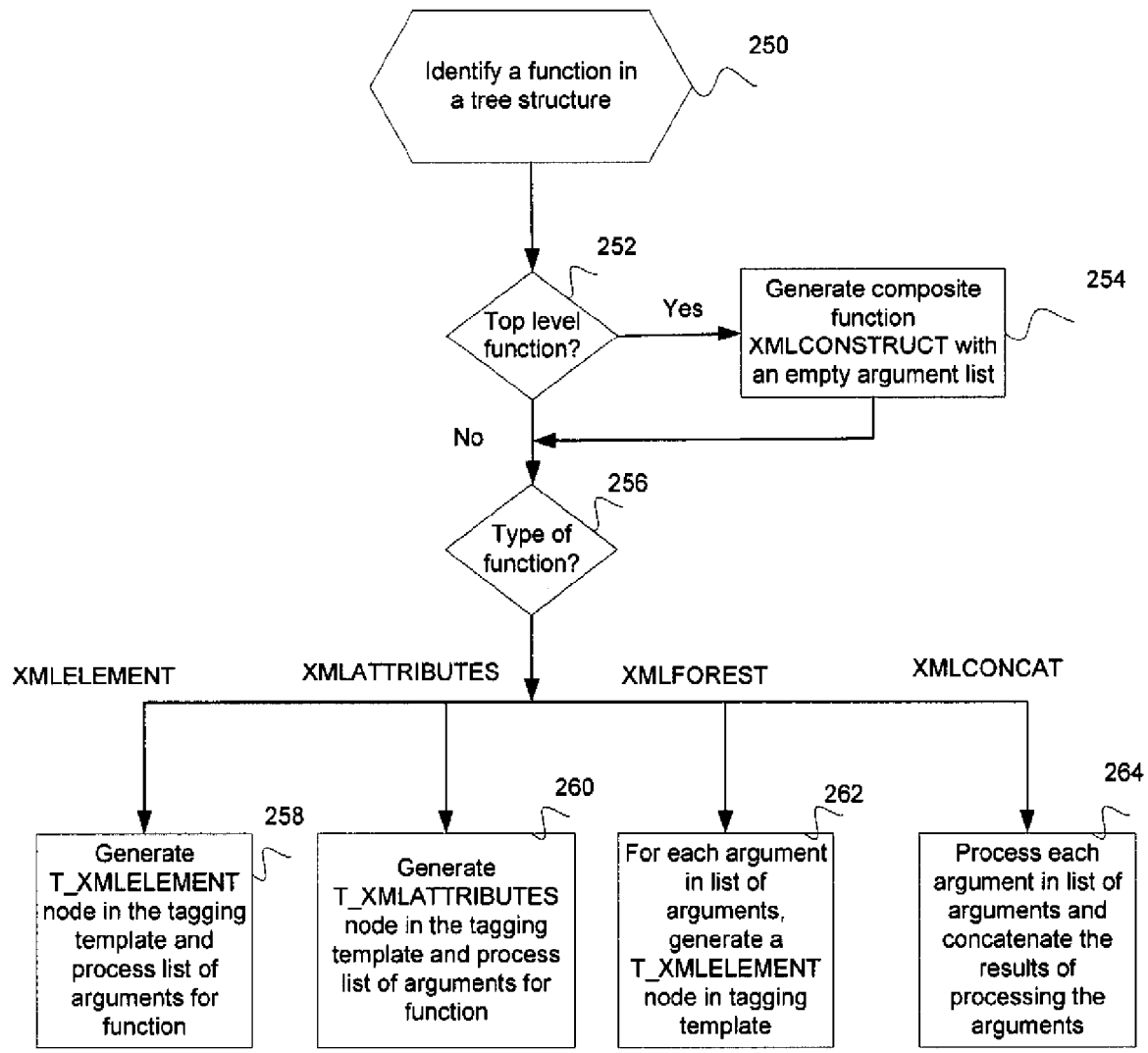
FIG. 2C illustrates logic implemented in nested function processor to process a function in a tree structure in accordance with certain implementations of the invention.

FIG. 2C illustrates logic implemented in nested function processor 140 to process a function in a tree structure 190 in accordance with certain implementations of the invention. Control begins at block 250 with the nested function processor 140 identifying a function in a tree structure 190. In block 252, the nested function processor 140 determines whether the function is a top level function. If the function is a top level function, processing continues to block 254, otherwise, processing continues to block 256. In block 254, the nested function processor 140 generates a composite function XMLCONSTRUCT with an empty argument list.

In block 256, the nested function processor 140 determines which type of function has been identified. If the function is an XMLELEMENT function, processing continues to block 258, and the nested function processor 140 generates a T_XMLELEMENT node in the tagging template 152 and processes the list of arguments for the XMLELEMENT function. If the function is an XMLATTRIBUTES function, processing continues to block 260, and the nested function processor 140 generates a T_XMLATTRIBUTES node in the tagging template 152 and processes the list of arguments for the XMLATTRIBUTES function. If the function is an XMLFOREST function, processing continues to block 262, and, for each argument in the list of arguments of the XMLFOREST function, the nested function processor 140 generates a T_XMLELEMENT node in the tagging template 152. If the function is an XMLCONCAT function, processing continues to block 264, and the nested function processor 140 processes each argument in the list of arguments of the XMLCONCAT function and concatenates the results of processing the arguments. In particular, for an XMLCONCAT function, the structures and arguments are linked (e.g., in a list or array). Arguments are appended to an argument list in the composite structure 151. Moreover, each argument in the list of arguments is processed sequentially and recursively to be added to the tagging template 152 (e.g., by constructing a node representing the argument).

Thus, for each argument of an XMLELEMENT function, if the argument is a constant, the argument is added to the tagging template (referenced from T_XMLELEMENT node). If the argument of the XMLELEMENT function is a SQL expression, the SQL expression is added to the list of arguments of the composite function 150, and the SQL expression is referenced using its ordinal number (e.g., the second argument in the list of arguments has ordinal number (2)). If the argument of the XMLELEMENT function is a nested function, the function processing of FIG. 2C is recursively called and results in pointing to the resulting nodes in the tagging template 152.

The XMLATTRIBUTES function is similarly processed, but involves a name and value for each argument.

The optimization technique of implementations of the invention combines nested XML publishing functions into a single composite function such that the input arguments from different levels of the nested XML publishing functions are combined into a single-level list. Certain implementations of the invention use a composite function 140 as the composite function. For example, for SELECT statement (3), the composite function 140 generates an XMLCONSTRUCT function (6).

```
XMLCONSTRUCT ( reference_to_tagging_template,      (6)
               e.fname || ' ' || e.lname,
               e.birthday,
               e.dept)
```

As a result of the mapping to the XMLCONSTRUCT function format, all the nested scalar functions (i.e., XMLELEMENT, XMLATTRIBUTES, and XMLFOREST) become flat without nesting. The result is that the XMLCONSTRUCT function evaluation process avoids unnecessary data movement.

FIG. 3 illustrates a sample XMLCONSTRUCT structure 300 representing an XMLCONSTRUCT function that is generated for nested functions in SELECT statement (3) in accordance with certain implementations of the invention. The XMLCONSTRUCT structure 300 is an example of a composite structure 151. The illustrated XMLCONSTRUCT structure 300 illustrates the format of a constructor structure for a composite function 150 in accordance with certain implementations of the inventions. Other formats for the constructor structure may be used without departing from the scope of the invention. The nested function processor 140 generates the XMLCONSTRUCT structure 300. XMLCONSTRUCT structure 300 references a tagging template 310. The XMLCONSTRUCT structure 300 also references a list of arguments identifying arguments to the composite function 150 and which correspond to the arguments marked with numbers in the tagging template 310. The list of arguments are e.fname ||' '|| e.lname 360, e.birthday 370, and e.dept 380.

The tagging template 310 includes a T_XMLELEMENT node 320, which represents the XMLELEMENT function. For ease of reference, a "T_" prefix will be used to indicate that a node is in a tagging template. The T_XMLELEMENT node 320 specifies an XML element with a name from the XMLELEMENT function, which in this example is "Emp" 322. If there are attributes nested within the XMLELEMENT function, the T_XMLELEMENT node 320 also references one or more XMLATTRIBUTES functions. In this example, the T_XMLELEMENT node 320 references T_XMLATTRIBUTES node 330, which in turn references an attribute "Name" 332. In the tagging template, the argument to be used during serialization is marked with a number (e.g., (1), (2), (3) etc. in the tagging template) that corresponds to the ordinal number of arguments that follows the tagging template in the XMLCONSTRUCT structure 300. The T_XMLELEMENT node 320 also references the XML elements that are generated for each argument of an XMLFOREST function. In this example, the T_XMLELEMENT node 320 references T_XMLELEMENT node 340, which has element name "birthday" 342 and content (2), where content (2) corresponds to the value of the second argument from the argument list, and T_XMLELEMENT node 350, which has element name "department" 352 and content (3), where content (3) corresponds to the value of the third argument from the argument list.

In certain implementations, the binding of the functions in SELECT statement (3) proceeds as follows. First, any top-level scalar XML function (e.g., XMLELEMENT) becomes an XMLCONSTRUCT function. For example, the XMLELEMENT function in SELECT statement (3) becomes XMLCONSTRUCT function (6). Additionally, a top-level node for the tagging template 310) is constructed, which is a T_XMLELEMENT node 320, with element name "Emp" 322.

Second, when the XMLATTRIBUTES function is processed in SELECT statement (3), the argument of the XMLATTRIBUTES function is added to the XMLCONSTRUCT function (6) list of arguments and a T_XMLATTRIBUTES node 330 is constructed in the tagging template 310. In this case, the name of the single attribute is "name", and the value of the attribute is the first argument 360 in the argument list for the XMLCONSTRUCT structure 300. So, e.fname ||' '|| e.lname is in the argument list of the XMLCONSTRUCT function (6) and the XMLCONSTRUCT structure 300.

Third, when the XMLFOREST function is processed, the XMLFOREST function is converted into a list of XMLELEMENTS, one for each of its arguments. In this example, two T_XMLELEMENT nodes 340, 350 are constructed in the tagging template 310. In the tagging template 310, T_XMLELEMENT nodes 340, 350 are connected to the current parent node, which is the top-level T_XMLELEMENT node 320. Also, two more arguments, e.birthday 370 and e.dept 380, are added to the list of arguments for the XMLCONSTRUCT function (6) and the XMLCONSTRUCT structure 300.

In block 206, the composite function 150 is processed to generate an intermediate result structure (e.g., 400) for each row.

Figure 4:
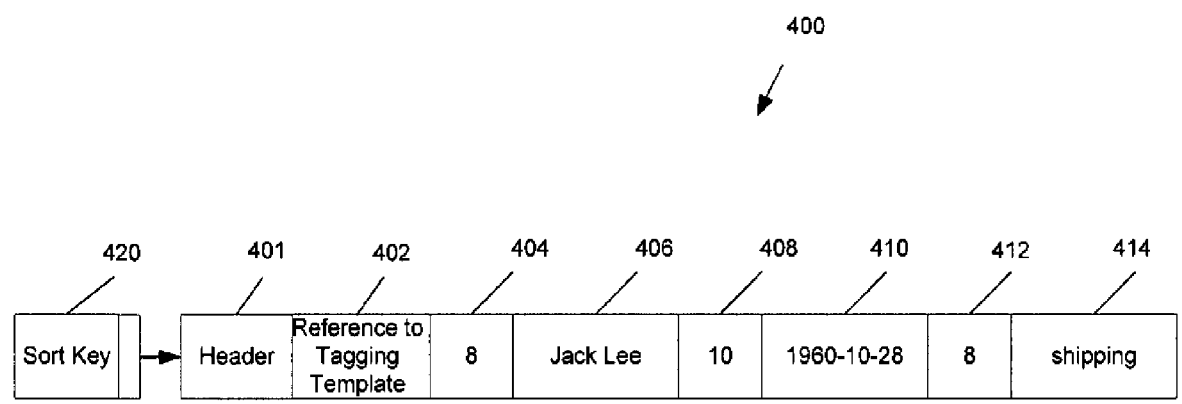
FIG. 4 illustrates a sample intermediate result structure in accordance with certain implementations of the invention.

While evaluating the composite function 150, intermediate result structures are generated. FIG. 4 illustrates a sample intermediate result structure 400 in accordance with certain implementations of the invention. The intermediate result structure 400 holds intermediate results (e.g., argument input values) that are used by the composite function 150 representing the different levels of the nested functions. In certain implementations, the intermediate result structure 400 may be a list or an array. For the following argument input values, frame='Jack', lname='Lee', birthday='10-28-1960', and dept='shipping', intermediate result structure 400 is generated, in which the numbers represent the length of the character strings for each argument input value. For example, a header 401 and a reference to a tagging template 402 are included in intermediate result structure 400. The header 401 includes a type field that indicates to indicate whether the structure is a single record (e.g., 400) or part of a group of records (e.g., 500) for an XMLAGG function. Although the header 401 and the reference to the tagging template 402 are illustrated as separate elements in the intermediate result structure 400, in certain implementations, the header 401 may include the reference to the tagging template 402. The intermediate result structure then includes the length of each argument input value followed by the content of the input value. For example, assuming that characters are encoded using Universal Transformation Format-8 (UTF-8, in which each character is one byte long), length 404 indicates that the argument input value "Jack Lee" 406 is 8 bytes in length. Length 408 indicates that the argument input value "1960-10-28" 410 is 10 bytes in length. Length 412 indicates that the argument input value "shipping" 414 is 8 bytes in length. Additionally, if a sort key is provided in the SELECT statement, then a sort key 420 is part of the intermediate result structure for a single row. For multiple rows, one intermediate result structure is generated for each row.

The result of the processing in block 206 is a set of rows, each of which has a column that references an intermediate result structure. The column of each row corresponds to one XMLAGG argument. If there are additional XMLAGG arguments, there would be additional columns holding references to intermediate result structures.

Rows are grouped together based on grouping columns specified in a GROUP BY clause, if one is specified. For example, the rows selected in SELECT statement (3) would be grouped by employee department (e.dept). In certain implementations, the GROUP BY clause is evaluated using a SORT operation or using an index, if the GROUP BY clause contains grouping columns. When the GROUP BY clause is missing, the rows to be evaluated for the aggregate function form one group.

Once processing in block 206 completes, processing continues to block 220. In block 220, the set of rows are sorted based on the Group By columns to form groups. In certain implementations, the GROUP BY clause may be evaluated using early grouping (available in the DB2® UDB database product). That is, during the sort process (block 220), if two or more rows near each other belong to the same group, they are combined using the Evaluation function, which can combine two linked lists for the partial groups (rather than appending one row at a time). In certain implementations, the GROUP BY clause may be evaluated using a hashing technique. Hashing techniques are well known in the art.

To differentiate a group and a single row, the XMLAGGREGATE header 510 for group structure 500 includes a type field that indicates that the header is for a group.

In certain implementations, the aggregate function processor 180 includes three functions: an Initiation function, an Evaluation function, and a Final function. The Initiation function initializes a group. The Evaluation function evaluates each row in the group and appends a new element to a doubly-linked list for the group. The Final function calls a quicksort to sort the doubly linked list, if a sort key is to be used based on an ORDER BY clause. In certain implementations, sorting based on the sort key manipulates links of the doubly-linked list without moving data.

In block 230, the aggregate function processor 180 selects the next group, beginning with a first group. In block 232, the aggregate function processor 180 determines whether all groups have been selected. If so, processed is done, otherwise, processing continues to block 234.

In block 234, the selected group is initialized. In certain implementations, the aggregate function processor 180 calls an initialization function to initialize a new group by constructing a group header (e.g., an XMLAGGREGATE header 510 in FIG. 5).

In block 236, an evaluation is performed to add appropriate links to the intermediate result structures to form aggregate element structures (e.g., 520 and 530 of FIG. 5) that are linked together to form a doubly-linked list for a group structure (e.g., 500).

Figure 5:
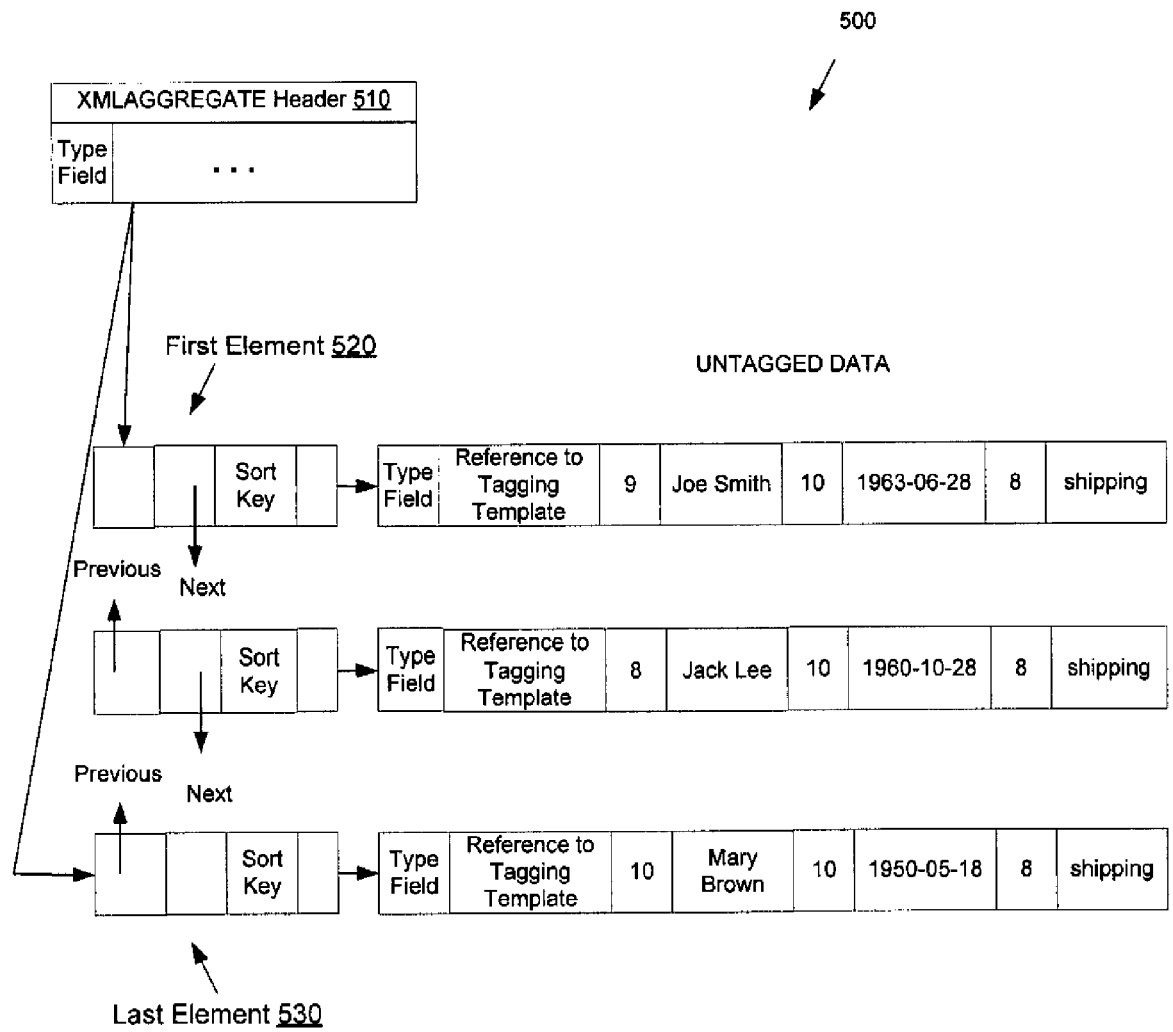
FIG. 5 illustrates a sample group structure for one group in accordance with certain implementations of the invention.

FIG. 5 illustrates a sample group structure 500 for one group in accordance with certain implementations of the invention. Tagging template 310 may be used for the data stored in the group structure 500 because the tagging template is independent of data. In certain implementations, a separate group structure is generated for each group. The group structure 500 has an XMLAGGREGATE header 510, which references (e.g., points to) a first aggregate element structure 520 and a last aggregates result structure 530 of a doubly linked list. The list is "doubly-linked" because each aggregate element structure has a reference to a previous and next aggregate element structure, except for the first aggregate element structure which does not have a reference to a previous aggregate element structure and for the last aggregate element structure, which does not have a reference to a next aggregate element structure. If an ORDER BY clause is included for the aggregate function, then the aggregate element structures include a sort key for use in sorting based on the ORDER BY clause.

In block 238, the aggregate element structures in the group structure are sorted based on an ORDER BY clause, if one is specified. In particular, implementations of the invention use in-memory quicksort to support ORDER BY of an XMLAGG function.

For the XMLAGG function in SELECT statement (3), the intermediate result values of the same group are linked together using a doubly-linked list, and they all share the same tagging template (e.g., in FIG. 5, the aggregate element structures each reference tagging template 310).

Thus, evaluation of the GROUP BY clause sorts data by the grouping columns, in this case, employee department (i.e., e.dept), and for rows in a group (i.e., employees in the same department), the XMLAGG function links the argument input values in a doubly-linked list with the ORDER BY key or keys. For each group, a quicksort is applied to the linked list, and the intermediate result is serialized after the quicksort. This approach incurs very low sort overhead, since no data is moved and only the linked list is adjusted. This approach may be applied to multiple XMLAGG functions with ORDER BY clauses independently. A significant performance advantage is achieved.

Serialization is performed when a final result is requested. In particular, once the tagging template 310 and aggregate element structures 500 have been generated, serialization occurs. In generating a final result for the XMLCONSTRUCT structure 300, the nested function processor 140 traverses the tagging template 310 and the argument input values of the intermediate structure 400 to create a serialized text string. This process of traversing the tagging template 310 and the argument input values and creating a serialized text string is referred to as "serialization." During serialization, if a T_XMLELEMENT is encountered, a start tag (starting with <) is generated, and the nested function processor 140 determines whether there are any attributes for the XML element. If the nested function processor 140 determines that there are one or more T_XMLATTRIBUTES nodes in tagging template 310, the attributes are included in the start tag, by traversing the attribute list in the tagging template 310 to generate an attribute list in the form of: <attribute name>='<value>' (e.g., fname='Jack', lname='Lee'). The value is obtained by the nested function processor 140 from the intermediate structure 400. If there are no attributes, the nested function processor 140 ends the start tag with an end tag (>).

If there are additional XMLELEMENT contents to process in the tagging template 310, they are inserted between the start tag and the end tag of the current XML element. Any nested T_XMLELEMENT or T_XMLATTRIBUTES functions in the tagging template 310 are traversed and processed in the same manner, recursively. In particular, the nested function processor 140 again generates tags to indicate the beginning and ending of the XMLELEMENTS and generates attribute lists (if there are attributes) for the XMLELEMENTS. The result of serialization of the aggregate element structures 500 is:

```
<Emp name = "Joe Smith"> <birthday>1963-06-28</birthday>
<department> shipping </department> </Emp>
<Emp name = "Jack Lee"> <birthday>1960-10-28</birthday>
<department> shipping </department> </Emp>
<Emp name = "Mary Brown"> <birthday>1950-05-18 </birthday>
<department> shipping </department> </Emp>
```

When the composite function is evaluated, late tagging is used to avoid unnecessary duplicates of serialized text strings. The term "late tagging" refers to deferring the addition of tags to argument input values when generating a final result. That is, with late tagging, the function is evaluated without putting tags around the input argument values in the intermediate structure, and these tags are added to the final result during serialization. Moreover, the late tagging technique saves space needed for the aggregate element structures.

Furthermore, with a late tagging technique, only one tagging template is shared among all the aggregate element structures for all the XML values in a group before the serialization for XMLAGG, and memory space is saved as compared to serialized intermediate XML values. That is, memory space is saved by sharing one tagging template with late tagging. On the other hand, with early tagging, a tagged text string for each row is saved (i.e., a "serialized intermediate result"), which requires more space.

The result of serialization for SELECT statement (5) is as follows:

```
<Dept deptno="D01" name="DEVELOPMENT CENTER">
    <Proj projno="AD3100" name="ADMIN SERVICES">
        <Emp empno="000010">CHRISTINE HAAS</Emp>
    </Proj>
    <Proj projno="MA2100" name="WELD LINE AUTOMATION">
        <Emp empno="000010">CHRISTINE HAAS</Emp>
        <Emp empno="000110">VINCENZO LUCCHESI</Emp>
    </Proj>
</Dept>
```

In certain implementations, the first portion of an element in a doubly linked list is combined with the second portion (i.e., rather than referencing the second portion) to further improve performance.

In certain implementations, quicksort may be deferred to the serialization time to avoid unnecessary sort in case the result is not used (e.g., in a table expression). For an XMLAGG function, the serialization time is the time it takes to traverse the doubly linked list, traverse the tagging template, and generate a final result.

In certain implementations, other sort techniques may be used instead of quicksort. Additionally, in certain implementations, before quicksort is performed, a test is performed to ensure the doubly-linked list is not already in order. If the doubly-linked list is already in order, there is no need for quicksort. Moreover, in certain implementations, a stack, as opposed to a queue, is used to describe the quicksort partitions, and this saves space needed for describing current partitions. If a queue is used, the maximum number of queue elements needed is equal to the number of elements in the doubly-linked list, therefore the space needed is equal to the number of elements in the doubly-linked list. In certain implementations, the doubly-linked list described in FIG. 5 is more suitable for internal sort.

In summary, with late tagging, for repetitive tagging patterns of an XMLAGG function, one copy of the tagging template is maintained until a serialized text string is generated. A serialized text string is the output of the composite function 150 or, for an XMLAGG function, serialization refers to traversing an intermediate result structure 500 and a tagging template 152 to build an XML result. Therefore, tagging templates also reduce the size of intermediate results when an XMLAGG function is involved.

FIG. 6 illustrates a sample XMLCONSTRUCT structure 600 that is generated for nested functions (5) with multiple attributes in accordance with certain implementations of the invention. The XMLCONSTRUCT structure 600 is an example of a composite structure 151. The XMLCONSTRUCT structure 600 is generated for the XMLELEMENT function in nested function (7), which has two attributes, e.id and e.fname ‖' '‖ e.lname.

```
XMLELEMENT(NAME "Emp",                              (7)
    XMLATTRIBUTES( e.id as "id",
    e.fname ‖ ' ' ‖ e.lname AS "name"),
    XMLFOREST(e.birthday, e.dept AS
    "department") )
```

XMLCONSTRUCT structure 600 references a T_XMLELEMENT node 620 in tagging template 610. The XMLCONSTRUCT structure 600 also references an argument list identifying arguments to the composite function 150 and which correspond to the arguments marked with numbers in the tagging template 610. Since there are multiple attributes, the arguments to the composite function 150 include both e.id 690 and e.fname ‖' '‖ e.lname 660, as well as, e.birthday 670 and e.dept 680.

The T_XMLELEMENT node 620 references the identifier of the XMLELEMENT, which in this example is "Emp" 622. The T_XMLELEMENT node 620 also references T_XMLATTRIBUTES node 630. In this example, the T_XMLELEMENT node 620 references T_XMLATTRIBUTES 630, which specifies an attribute "ID" 632 and an attribute "Name" 634. The T_XMLELEMENT node 620 also references the XML elements that are generated for each argument of an XMLFOREST function. In this example, the T_XMLELEMENT node 620 references T_XMLELEMENT 640, which has name "birthday" 642 and content (3) from the third argument of the argument list, and T_XMLELEMENT 650, which has name "department" 652 and content (4) from the fourth argument of the argument list.

DB2 is a trademark of International Business Machines Corporation.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The variations for the representation include using a linked list for multiple attributes, instead of an array or list illustrated in FIG. 4.

Although implementations of the invention refer to use of a doubly-linked list, other data structures may be used.

The logic of FIGS. 2A, 2B, and 2C describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The illustrated logic of FIGS. 2A, 2B, and 2C was described as being implemented in software. The logic may be implemented in hardware or in programmable and non-programmable gate array logic.

Figure 7:
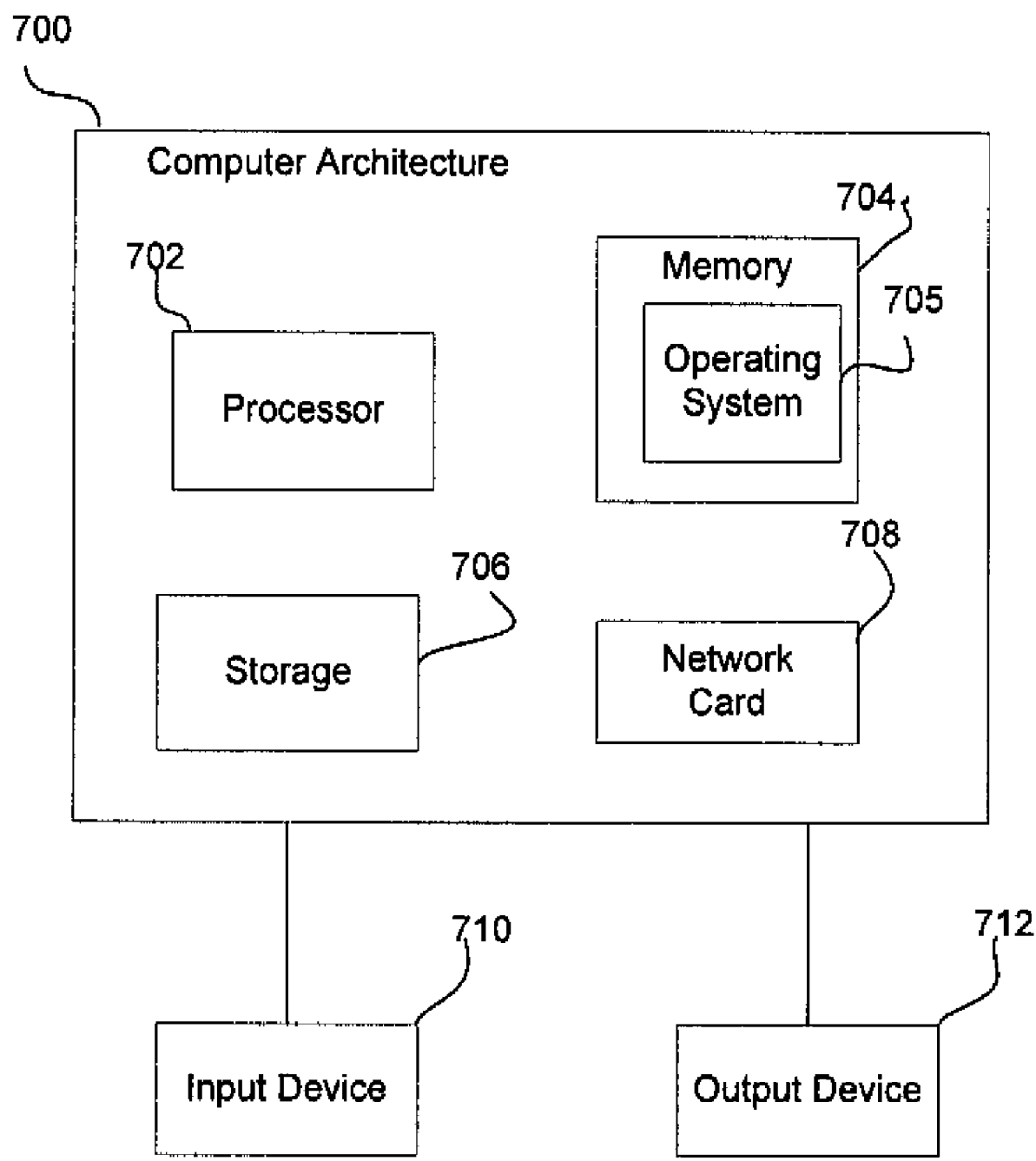
FIG. 7 illustrates one implementation of the architecture of the computer systems of FIG. 1 in accordance with certain implementations of the invention.

FIG. 7 illustrates one implementation of the architecture of the computer systems 100 and 120 in accordance with certain implementations of the invention. The computer systems 100 and 120 may implement a computer architecture 700 having a processor 702 (e.g., a microprocessor), a memory 704 (e.g., a volatile memory device), and storage 706 (e.g., a non-volatile storage, such as magnetic disk drives, optical disk drives, a tape drive, etc.). An operating system 705 may execute in memory 704. The storage 706 may comprise an internal storage device or an attached or network accessible storage. Programs in the storage 706 are loaded into the memory 704 and executed by the processor 702 in a manner known in the art. The architecture further includes a network card 708 to enable communication with a network. An input device 710 is used to provide user input to the processor 702, and may include a keyboard, mouse, pen-stylus, microphone, touch sensitive display screen, or any other activation or input mechanism known in the art. An output device 712 is capable of rendering information transmitted from the processor 702, or other component, such as a display monitor, printer, storage, etc.

The computer 700 may comprise any computing device known in the art, such as a mainframe, server, personal computer, workstation, laptop, handheld computer, telephony device, network appliance, virtualization device, storage controller, etc. Any processor 702 and operating system 705 known in the art may be used.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for making a computer implemented process to enable processing of an aggregate function, said method comprising:

instantiating first computer instructions onto a computer readable medium, said first computer instructions configured to, if a first argument of the aggregate function is a nested function, generate a composite structure that includes a tagging template for the nested function and generate an intermediate result structure for each row to be processed by the aggregate function, wherein each intermediate result structure references the tagging template;

instantiating second computer instructions onto a computer readable medium, said second computer instructions configured to group rows that contain a reference to intermediate result structures to form groups, wherein each of the intermediate result structures holds intermediate results including argument input values to represent different levels of nested functions; and instantiating third computer instructions onto a computer readable medium, said third computer instructions configured to, for each group, form aggregate element structures in memory from the intermediate result structures and, if the aggregate function specifies ordering, sort the aggregate element structures based on a sort key in memory.

2. The method of claim 1, wherein the first argument of the aggregate function is a column representing intermediate result structures.

3. The method of claim 1, wherein said second computer instructions configured to group rows are adapted to group the rows based on one or more grouping columns.

4. The method of claim 1, further comprising:

instantiating fourth computer instructions onto a computer readable medium, said fourth computer instructions configured to performing serialization after the aggregation function has been processed.

5. The method of claim 1, wherein the aggregate element structures form a doubly-linked list.

6. The method of claim 1, wherein each group of aggregate element structures has a group header.

7. The method of claim 6, wherein the group header references a first aggregate element structure and a last aggregate element structure in a group of aggregate element structures.

8. The method of claim 1, wherein said third computer instructions configured to sort the aggregate element structures based on the sort key are adapted to further perform an in-memory sort for the aggregate element structures for a group based on the sort key.

9. The method of claim 8, wherein the aggregate element structures form a doubly-linked list and wherein said third computer instructions configured to sort are adapted to manipulate links of the doubly-linked list without moving data.

* * * * *